United States Patent [19]
Takahata et al.

[11] Patent Number: 5,763,971
[45] Date of Patent: Jun. 9, 1998

[54] SUPERCONDUCTING BEARING DEVICE

[75] Inventors: Ryoichi Takahata, Kashiba; Taisaku Hashimoto, Kashiwara, both of Japan

[73] Assignee: Koyo Seiko Co., Ltd., Osaka, Japan

[21] Appl. No.: 406,223

[22] Filed: Mar. 16, 1995

[51] Int. Cl.⁶ ............... H02K 55/00; B60L 13/04
[52] U.S. Cl. ............ 310/90.5; 505/903; 505/877; 505/166
[58] Field of Search ............ 310/90.5; 505/877, 505/878, 903, 166

[56] References Cited

U.S. PATENT DOCUMENTS

| | | | |
|---|---|---|---|
| 3,889,140 | 6/1975 | Baermann | 310/103 |
| 3,909,647 | 9/1975 | Peterson | 310/156 |
| 4,065,189 | 12/1977 | Sikorra | 308/10 |
| 4,072,370 | 2/1978 | Wasson | 308/10 |
| 4,079,273 | 3/1978 | Lambrecht et al. | 310/52 |
| 4,797,386 | 1/1989 | Gyorgy et al. | 505/1 |
| 4,987,674 | 1/1991 | Denk | 29/596 |
| 5,177,387 | 1/1993 | McMichael et al. | 310/90.5 |
| 5,196,748 | 3/1993 | Rigney | |
| 5,220,232 | 6/1993 | Rigney, II et al. | 310/90.5 |
| 5,254,528 | 10/1993 | Takahata | 505/1 |
| 5,314,868 | 5/1994 | Takahata et al. | 505/166 |
| 5,330,967 | 7/1994 | Takahata et al. | 505/166 |
| 5,350,958 | 9/1994 | Ohnishi | 310/52 |
| 5,406,157 | 4/1995 | New | 310/90.5 |
| 5,438,038 | 8/1995 | Takahata et al. | 310/90.5 |
| 5,446,018 | 8/1995 | Takahata et al. | 310/90.5 |
| 5,563,565 | 10/1996 | Hull | 335/216 |

FOREIGN PATENT DOCUMENTS

| | | |
|---|---|---|
| 3-1282 | 7/1994 | Japan. |
| WO 93/16294 | 8/1993 | WIPO. |

*Primary Examiner*—Thomas M. Dougherty
*Assistant Examiner*—B. Mullins
*Attorney, Agent, or Firm*—Reid & Priest LLP

[57] ABSTRACT

A superconducting bearing device comprises a permanent magnet portion fixedly mounted on a rotary body concentrically therewith, and a superconductor opposed to the magnet portion and spaced apart therefrom radially of the rotary body, the magnet portion being so disposed that the rotation of the rotary body does not alter the magnetic flux distribution around the axis of rotation of the rotary body, the superconductor being disposed at a position which is spaced apart from the magnet portion by a distance permitting a predetermined quantity of magnetic flux thereof to penetrate into the superconductor and which does not permit the rotation of the rotary body to alter the penetrating magnetic flux distribution. The magnet portion comprises a plurality of annular permanent magnets arranged at a spacing along the axis of rotation of the rotary body and an annular yoke of ferromagnetic material interposed between each two adjacent magnets. Each of the magnets is magnetized to opposite polarities at its respective opposite ends in the direction of the axis of rotation, each two adjacent magnets being magnetized to the same polarity at their ends opposed to each other with the yoke interposed therebetween.

9 Claims, 3 Drawing Sheets

SUPERCONDUCTING BEARING DEVICE

BACKGROUND OF THE INVENTION

The present invention relates to superconducting bearing devices, for example, for use in hydraulic machines and machine tools which require high-speed rotation, power storage apparatus for storing excessive electric power as converted to kinetic energy of a flywheel, or gyroscopes.

In recent years, superconducting bearing devices capable of supporting a rotary body in a non-contact state have been developed as bearing devices permitting high-speed rotation of the rotary body and having high rigidity.

Such superconducting bearing devices are contrived which comprise, for example, an annular permanent magnet disposed concentrically with a rotary body and having two ends which are opposite with respect to the direction of rotation axis of the rotary body and which are magnetized to polarities opposite to each other, and an annular superconductor provided on a fixed portion and opposed to an end face of the magnet at a distance therefrom axially of the rotary body. The permanent magnet is so disposed that the rotation of the rotary body will not alter the magnetic flux distribution around the axis of rotation of the rotary body. The superconductor is provided at a position which is spaced apart from the magnet by a distance permitting a predetermined quantity of magnetic flux thereof to penetrate into the superconductor and which will not allow the rotation of the rotary body to alter the penetrating magnetic flux distribution. With the superconducting bearing device described, the magnetic flux generated by the magnet is permitted to penetrate into the superconductor and restrained thereby so as to support the rotary body axially and radially thereof by the resulting pinning force contactlessly relative to the fixed portion.

However, the superconducting bearing device has the problem that the quantity of magnetic flux penetrating into the superconductor is insufficient to render the device insufficient in rigidity with respect to the direction of axis of rotation and in load capacity. Moreover, the insufficient rigidity entails the problem that the rotary body can not be supported in a noncontact state with stability owing to the deflection of the axis of the rotary body.

SUMMARY OF THE INVENTION

An object of the present invention is to provide a superconducting bearing device which is free of the foregoing problems.

Other objects of the invention will be readily understood from the following description.

The present invention provides a superconducting bearing device which comprises a permanent magnet portion fixedly mounted on a rotary body concentrically therewith, and a superconductor opposed to the magnet portion and spaced apart therefrom radially of the rotary body, the permanent magnet portion being so disposed that the rotation of the rotary body does not alter the magnetic flux distribution around the axis of rotation of the rotary body, the superconductor being disposed at a position which is spaced apart from the magnet portion by a distance permitting a predetermined quantity of magnetic flux thereof to penetrate into the superconductor and which does not permit the rotation of the rotary body to alter the penetrating magnetic flux distribution, the magnet portion comprising a plurality of annular permanent magnets arranged at a spacing along the axis of rotation of the rotary body and an annular yoke of ferromagnetic material interposed between each two adjacent permanent magnets, each of the permanent magnets being magnetized to opposite polarities at its respective opposite ends in the direction of the axis of rotation, each two adjacent permanent magnets being magnetized to the same polarity at their ends opposed to each other with the yoke interposed therebetween.

According to an aspect of the invention, the permanent magnet at each of the axial opposite ends of the rotary body is further provided with a yoke of ferromagnetic material on one side thereof outward with respect to the direction of the axis of rotation.

According to another aspect of the invention, the superconductor is opposed to the outer periphery of the magnet portion and spaced apart therefrom radially of the rotary body. In this case, the yokes may be larger than the permanent magnets in outside diameter. In this case, the permanent magnet portion may further comprise a hollow cylinder of nonmagnetic material fixedly fitted around the rotary body and formed with a groove in its outer periphery, the plurality of annular permanent magnets and the annular yokes being fixedly fitted in the groove in the outer periphery of the cylinder.

According to another aspect of the invention, the superconductor is opposed to the inner periphery of the magnet portion and spaced apart therefrom radially of the rotary body. In this case, the permanent magnet portion may comprise a hollow cylinder of nonmagnetic material formed on the peripheral edge of a horizontal disk fixedly provided around the rotary body, the plurality of annular permanent magnets and the annular yokes being fixedly fitted to the inner periphery of the cylinder.

The present invention provides a second superconducting bearing device which comprises a permanent magnet portion fixedly mounted on a rotary body concentrically therewith, and a superconductor opposed to an end face of the magnet portion and spaced apart therefrom axially of the rotary body, the permanent magnet portion being so disposed that the rotation of the rotary body does not alter the magnetic flux distribution around the axis of rotation of the rotary body, the superconductor being disposed at a position which is spaced apart from the magnet portion by a distance permitting a predetermined quantity of magnetic flux thereof to penetrate into the superconductor and which does not permit the rotation of the rotary body to alter the penetrating flux distribution, the permanent magnet portion comprising a plurality of annular permanent magnets arranged at a spacing radially of the rotary body and an annular yoke of ferromagnetic material interposed between each two adjacent permanent magnets, each of the permanent magnets being magnetized to opposite polarities at its respective side portions in the radial direction, each two adjacent permanent magnets being magnetized to the same polarity at their side portions opposed to each other with the yoke interposed therebetween.

According to other aspect of the present invention, the second superconducting bearing device may have the following features.

The innermost and outermost permanent magnets with respect to the radial direction of the rotary body are further provided with an annular yoke of ferromagnetic material on the radially inner and outer sides thereof respectively.

The yokes each have an end face opposed to the superconductor and projecting beyond the corresponding end faces of the permanent magnets toward the superconductor.

The annular permanent magnets each comprise a plurality of divided segments arranged circumferentially thereof.

The permanent magnet portion further comprises a disk of nonmagnetic material fixedly fitted around the rotary body and having an annular groove in an end face thereof opposed to the superconductor, the plurality of annular permanent magnets and the annular yokes being fixedly fitted in the groove of the disk.

With the superconducting bearing devices of the present invention described, the permanent magnet portion and the superconductor are held opposed to each other as spaced apart by a predetermined distance, and the rotary body is supported axially and radially thereof by the superconductor contactlessly.

In the case of these bearing devices, magnetic fluxes concentrate on the ferromagnetic yokes locally at the portions thereof opposed to the superconductor and consequently penetrate into the superconductor in an increased quantity, hence an increased load capacity and improved rigidity. Accordingly, the rotary body can be supported in a noncontact state stably without deflection of its axis. With the uniformity of magnetic flux density improved with respect to the direction of rotation, the bearing device is further rotatable with improved accuracy.

The present invention will be described in greater detail with reference to the accompanying drawings.

DESCRIPTION OF THE PREFERRED EMBODIMENTS

Figure 1:
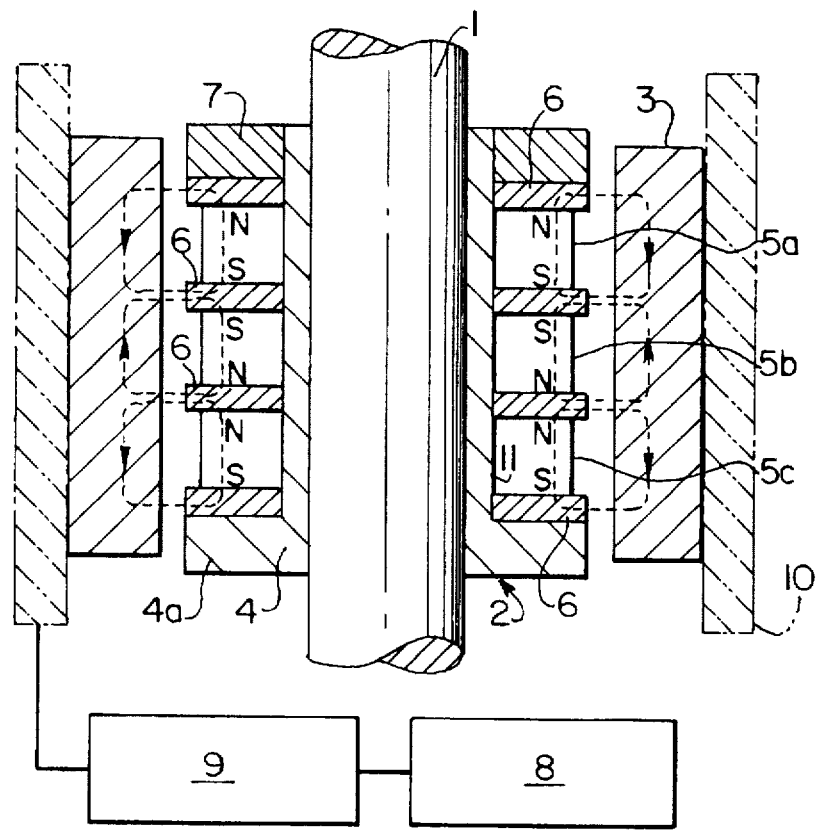
FIG. 1 is a schematic view in vertical section showing the main portion of a superconducting bearing device as a first embodiment of the invention.

Throughout the drawings, like parts are designated by like reference numerals.

FIG. 1 shows a first embodiment of superconducting bearing device. With reference to FIG. 1 schematically showing the main portion of the bearing device, the bearing device comprises a rotary body 1 in the form of a vertical shaft and made of a steel which is a ferromagnetic material. An annular permanent magnet portion 2 is fixedly mounted on the rotary body 1 concentrically therewith, and an annular superconductor 3 is so disposed as to be opposed to the outer periphery of the permanent magnet portion 2 and spaced apart therefrom radially of the rotary body 1.

The magnet portion 2 comprises a vertical hollow cylinder 4 fixedly fitted around the rotary body 1 and made of a nonmagnetic material such as nonmagnetic stainless steel or copper. The cylinder 4 has an outer flange 4a integral with its lower end. A plurality of annular permanent magnets 5a, 5b, 5c are fitted around the cylinder 4 and arranged at a spacing along the axis of rotation of the rotary body. Annular yokes 6 of ferromagnetic material are fitted around the cylinder 4 and positioned between the adjacent magnets 5a, 5b, 5c, on the upper side of the uppermost magnet 5a and on the lower side of the lowermost magnet 5c, respectively. Provided on the upper side of the uppermost yoke 6 is a fixing ring 7 fixedly fitted around the cylinder 4 and made of a nonmagnetic material such as nonmagnetic stainless steel or copper, whereby the permanent magnets 5a, 5b, 5c and the yokes 6 are secured in place. In other words, the outer periphery of the cylinder 4, the outer flange 4a and the fixing ring 7 define an annular groove 11 having the annular magnets 5a, 5b, 5c and the yokes 6 fixedly fitted therein.

The yokes 6 are larger than the magnets 5a, 5b, 5c in outside diameter. The outer peripheries of the yokes 6 project radially outward beyond the outer peripheries of the magnets 5a to 5c. Each of the magnets 5a to 5c in magnetized to opposite polarities at its upper and lower ends, respectively. Each two adjacent magnets 5a, 5b (5b, 5c) are magnetized to the same polarity at their ends opposed to each other with the yoke 6 interposed therebetween. For example, the uppermost magnet 5a has an N pole at its upper end and an S pole at its lower end, the middle magnet 5b has an S pole at its upper end and an N pole at its lower end, and the lowermost magnet 5c has an N pole at its upper end and an S pole at its lower end. The distribution of magnetic flux around the axis of rotation remains unaltered. Preferably, the length of each ferromagnetic yoke 6 along the axis of rotation of the body 1 (i.e., vertical thickness of the yoke) is decreased to the limit of magnetic saturation.

The superconductor 3 comprises a bulk of high-temperature superconductive material of the yttrium type e.g., $YBa_2Cu_3O_{7-x}$, containing normally conductive particles ($Y_2Ba_1Cu_1$) as uniformly dispersed therein, and has properties to restrain the magnetic flux generated by the permanent magnet portion 2 and penetrating thereinto. The superconductor 3 is disposed at a position which is spaced apart from the magnetic portion 2 by a distance permitting a predetermined quantity of magnetic flux thereof to penetrate thereinto and which will not permit the rotation of the rotary body 1 to alter the penetrating magnetic flux distribution.

A cooling case 10 which is cooled as by a refrigerator 8 via a temperature control unit 9 is fixedly provided in a housing (not shown) for the bearing device. The superconductor 3 is secured to the cooling case 10.

When the superconducting bearing device is to be operated, the superconductor 3 is cooled with a suitable refrigerant recycled through the cooling case 10, and is maintained in a Type II superconducting state. Consequently, a flux portion included in the magnetic flux emitted by the permanent magnet portion 2 on the rotary body 1 and penetrating into the superconductor 3 is restrained (pinning phenomenon). The normally conductive particulate material uniformly dispersed in the superconductor 3 assures the superconductor 3 of a uniform penetrating flux distribution therein, whereby the rotary body 1 is restrained along with the magnet portion 2 relative to the superconductor 3. Accordingly, the rotary body 1 is supported axially and radially thereof as levitated with high stability.

The ferromagnetic yokes 6 are arranged between the adjacent permanent magnets 5a, 5b and 5b, 5c of the magnet portion 2, on the upper side of the uppermost magnet 5a and on the lower side of the lowermost magnet 5c, respectively, so that each magnet and the yokes 6 on its upper and lower sides form a magnetic circuit as indicated in a broken line in FIG. 1, permitting the magnetic flux to concentrate on each yoke 6 locally at its outer peripheral portion. This enables an increased quantity of magnetic flux to penetrate into the superconductor 3, consequently giving an increased load capacity and improved rigidity and further improving the uniformity of magnetic flux density in the direction of rotation to render the bearing device rotatable with higher accuracy.

Figure 2:
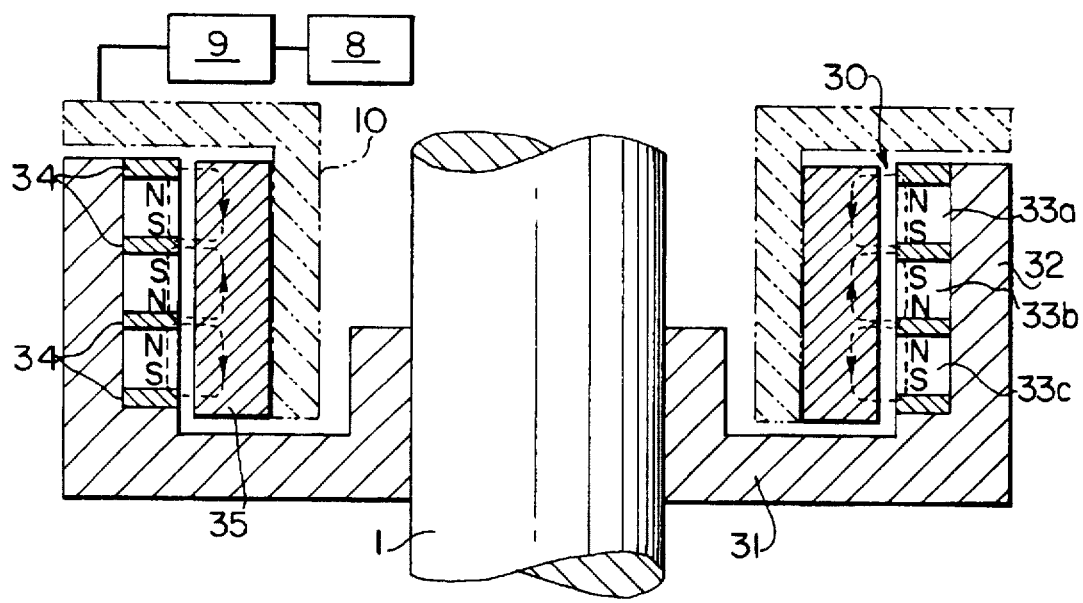
FIG. 2 is a schematic view in vertical section showing the main portion of another superconducting bearing device as a second embodiment of the invention.

FIG. 2 shows a second embodiment of superconducting bearing device. With reference to FIG. 2 schematically showing the bearing device, a permanent magnet portion 30 comprises a vertical hollow cylinder 32 extending upright from the outer peripheral edge of a horizontal disk 31 integrally therewith. The disk 31 is fixedly fitted around a rotary body 1 and made of a nonmagnetic material such as nonmagnetic stainless steel or copper. A plurality of annular permanent magnets 33a, 33b, 33c are inserted in the cylinder 32 by a press fit, as arranged at a spacing along the axis of rotation of the rotary body 1. Annular yokes 34 of ferromagnetic material are inserted in the cylinder 32 by a press fit and arranged between the adjacent magnets 33a, 33b, 33c, on the upper side of the uppermost magnet 33a and on the lower side of the lowermost magnet 33c, respectively.

The permanent magnets 33a to 33c and the yokes 34 have equal inside diameters. Each of the magnets 33a to 33c is magnetized to opposite polarities at its upper and lower ends, respectively. Each two adjacent magnets 33a, 33b (33b, 33c) are magnetized to the same polarity at their ends opposed to each other with the yoke 34 interposed therebetween. For example, the uppermost magnet 33a has an N pole at its upper end and an S pole at its lower end, the middle magnet 33b has an S pole at its upper end and an N pole at its lower end, and the lowermost magnet 33c has an N pole at its upper end and an B pole at its lower end. The distribution of magnetic flux around the axis of rotation remains unaltered. Preferably, the length of each ferromagnetic yoke 34 along the axis of rotation of the body 1 (i.e., vertical thickness of the yoke) is decreased to the limit of magnetic saturation.

An annular superconductor 35 is disposed so as to be opposed to the inner periphery of the permanent magnet portion 30 and spaced apart therefrom radially of the rotary body 1. The superconductor 35 is similar to the superconductor 3 of the foregoing first embodiment, and is secured to a cooling case 10 which is fixedly provided inside a housing (not shown) for the bearing device and which is cooled as by a refrigerator 8 via a temperature control unit 9. In the case of the second embodiment as described with reference to the first embodiment, each of the magnets 33a, 33b, 33c and the yokes 34 on the respective upper and lower sides thereof form a magnetic circuit as indicated in a broken line in FIG. 2, permitting the magnetic flux to concentrate on each yoke 34 locally at its inner peripheral portion. This enables an increased quantity of magnetic flux to penetrate into the superconductor 35, consequently giving an increased load capacity and improved rigidity and further improving the uniformity of magnetic flux density along the direction of rotation to render the bearing device rotatable with higher accuracy. Additionally, the ferromagnetic yokes 34 arranged on the upper side of the uppermost magnet 33a and on the lower side of the lowermost magnet 33c, respectively, reduce the leakage of flux to the outside to ensure an effective flux distribution.

Further in the case of the second embodiment, the permanent magnet portion 30 has its magnets 33a to 33c and the yokes 34 arranged inside the vertical cylinder 32, so that even if the rotary body 1 is rotated at a high speed, the magnets 33a to 33c and the yokes 34 are prevented from breaking owing to the resulting centrifugal force.

Figure 3:
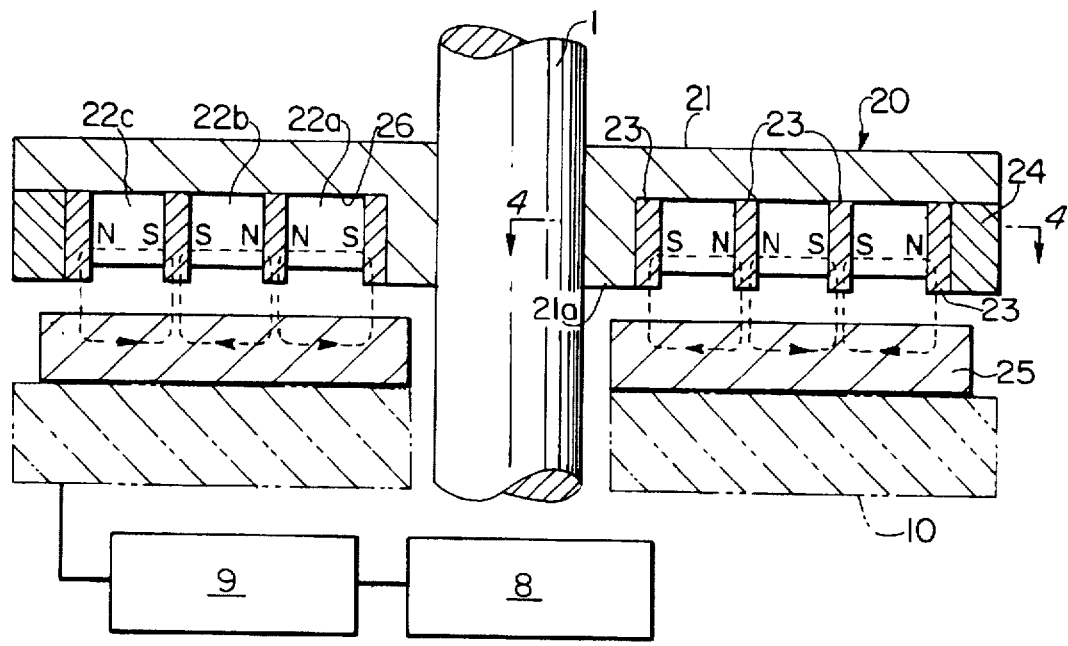
FIG. 3 is a schematic view in vertical section showing the main portion of another superconducting bearing device, i.e., a third embodiment of the invention.

FIG. 3 shows a third embodiment of superconducting bearing device. With reference to FIG. 3 schematically showing the main portion of the bearing device, a permanent magnet portion 20 comprises a horizontal disk 21 fixed to a rotary body 1 concentrically therewith and made of a nonmagnetic material such as nonmagnetic stainless steel or copper. The disk 21 is integrally formed with a cylindrical wall 21a extending downward from its inner peripheral edge portion. A plurality of annular permanent magnets 22a, 22b, 22c are arranged around the cylindrical wall 21a at a spacing radially thereof. Annular yokes 23 of ferromagnetic material are arranged between the adjacent magnets 22a, 22b and 22b, 22c, on the inner side of the radially innermost magnet 22a and on the outer side of the radially outermost magnet 22c, respectively. A fixing ring 24 made of a nonmagnetic material such as nonmagnetic stainless steel or copper is fixedly fitted around the radially outermost yoke 23, whereby the magnets 22a to 22c and the yokes 23 are secured in place. In other words, the lower face of the disk 21, the cylindrical wall 21a and the fixing ring 24 define an annular groove 26, which has the magnets 22a to 22c and the yokes 23 fixedly fitted therein.

The lower ends of the yokes 23 project downward beyond the lower ends of the magnets 22a, 22b, 22c. Each of the magnets 22a to 22c is magnetized to opposite polarities at its radial opposite sides, respectively. Each two adjacent magnets 22a, 22b (22b, 22c) are magnetized to the same polarity at their sides opposed to each other with the yoke 23 interposed therebetween. For example, the innermost magnet 22a has an S pole at its inner side and an N pole at its outer side, the middle magnet 22b has an N pole at its inner side and an S pole at its outer side, and the outermost magnet 22c has an S pole at its inner side and an N pole at its outer side. The distribution of magnetic flux around the axis of rotation remains unaltered. Preferably, the radial thickness of each ferromagnetic yoke 23 is decreased to the limit of magnetic saturation.

Figure 4:
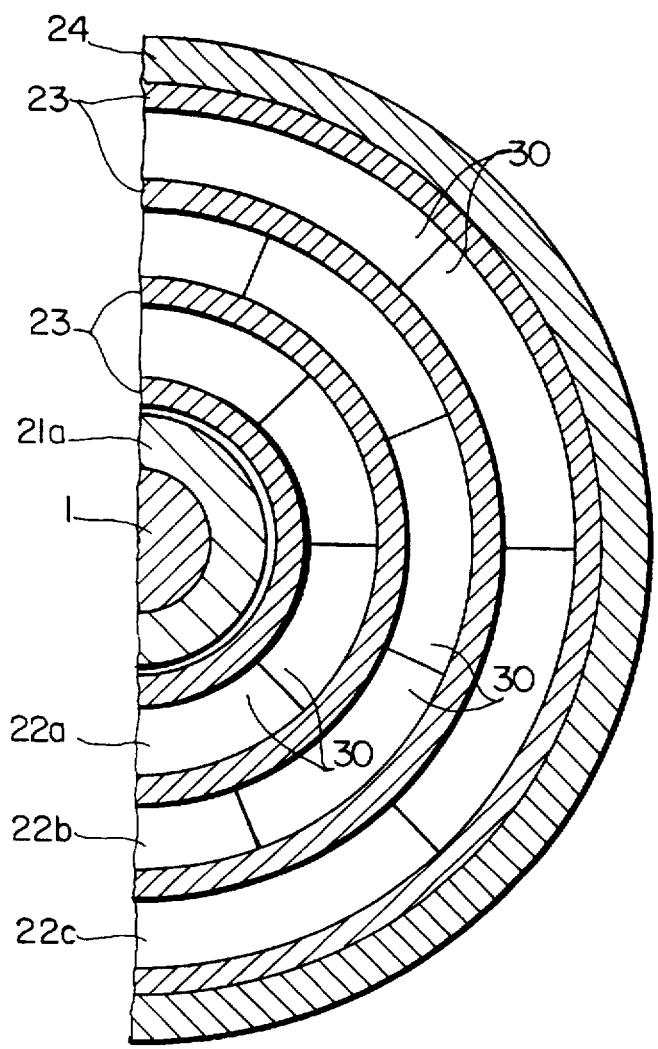
FIG. 4 is a sectional view corresponding to a view in section taken along the line X—X in FIG. 3 and showing modified annular permanent magnets as used in the third embodiment.

It is generally difficult to prepare as a single piece each of the annular permanent magnets 22a to 22c having opposite polarities at its radial opposite sides, by radial magnetization. Accordingly, the magnet is often prepared in the form of segments divided circumferentially thereof as seen in FIG. 4. Thus, a plurality of circular-arc permenent magnets 30 are used in combination as an annular assembly. In this case, the magnetic flux density is likely to involve slight nonuniformity circumferentially of the annular magnets 22a to 22c, whereas the ferromagnetic yokes 23 arranged between the adjacent magnets 22a, 22b and 22b, 22c and on the radially innermost and outermost sides act to diminish the nonuniformity of flux density.

An annular super conductor 25 is disposed so as to be opposed to the lower end face of the permanent magnet portion 20 and spaced apart therefrom axially of the rotary body 1. The superconductor 25 is similar to the superconductor 3 of the foregoing first embodiment, and is secured to a cooling case 10 which is fixedly provided inside a housing (not shown) for the bearing device and which is cooled as by a refrigerator 8 via a temperature control unit 9.

In the case of the third embodiment as described with reference to the first embodiment, each of the magnets 22a, 22b, 22c and the yokes 23 on the radially inner and outer sides thereof form a magnetic circuit as indicated in a broken line in FIG. 3, permitting the magnetic flux to concentrate on each yoke 23 locally at its lower end. This enables an increased quantity of magnetic flux to penetrate into the superconductor 25, consequently giving an increased load capacity and improved rigidity and further improving the uniformity of magnetic flux density along the direction of rotation to render the bearing device rotatable with higher accuracy. Especially, the radially inner yoke 23 suppresses the leakage of flux to the rotary body 1 of steel, i.e., ferromagnetic material, to assure an effective flux distribution.

Figure 5:
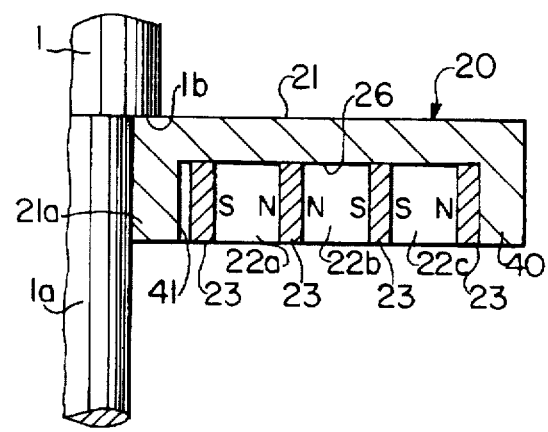
FIG. 5 is a fragmentary view in vertical section showing a modified permanent magnet portion for use in the third embodiment.

As shown in FIG. 5, the disk 21 of the magnet portion 20 of the third embodiment may be formed on its bottom face with a cylindrical wall 40 extending downward from the disk outer peripheral edge integrally therewith and substituting for the fixing ring 24. The magnets 22a to 22c and the yokes 23 are then inserted close to the wall 40 by a press fit so as to form a small clearance between the inner periphery of the innermost yoke 23 and the outer periphery of the cylindrical wall 21a. The rotary body 2 shown in FIG. 5 is a vertical shaft having a stepped portion. The disk 20 is fixedly fitted around its small-diameter portion 1a in bearing contact with the stepped portion 1b.

Although the three embodiments described each have three permanent magnets, the number of magnets is not limited to three but is suitably variable. It is not always necessary to use the uppermost and lowermost yokes in the first and second embodiments and to use the radially innermost and outermost yokes in the third embodiment.

What is claimed is:

1. A superconducting bearing device comprising:

a rotary body made of ferromagnetic steel;

a permanent magnet portion fixedly mounted on the rotary body, concentrically therewith, the permanent magnet portion being so disposed that the rotation of the rotary body does not alter the magnetic flux distribution around the axis of rotation of the rotary body, the permanent magnet portion being arranged in a position which is spaced apart radially of the rotary body and comprising a hollow cylinder of nonmagnetic material fixedly mounted on the rotary body concentrically therewith and having an inner peripheral surface, a plurality of annular permanent magnets fixedly mounted to the inner peripheral surface of the hollow cylinder and arranged at a spacing along the axis of rotation of the rotary body, and an annular yoke of ferromagnetic material fixedly fitted to the inner peripheral surface of the hollow cylinder and interposed between each two adjacent permanent magnets, each of the permanent magnets being magnetized to opposite polarities at its respective opposite ends in the direction of the axis of rotation of the rotary body, each two adjacent permanent magnets being magnetized to the same polarity at their ends opposed to each other with the yoke interposed therebetween; and a superconductor opposed to the magnet portion and spaced apart therefrom radially of the rotary body, the superconductor being disposed at a position which is spaced apart from the magnet portion by a distance permitting a predetermined quantity of magnetic flux of the magnet portion to penetrate into the superconductor and which does not permit the rotation of the rotary body to alter the penetrating magnetic flux distribution, the superconductor being arranged to be opposed to the inner peripheral surface of the permanent magnet portion and spaced apart therefrom radially of the rotary body.

2. A superconducting bearing device as defined in claim 1 wherein the permanent magnet at each of the axial opposite ends of the rotary body is further provided with a yoke of ferromagnetic material on one side thereof outward with respect to the direction of the axis of rotation.

3. A superconducting bearing device comprising:

a rotary body made of ferromagnetic steel;

a permanent magnet portion fixedly mounted on the rotary body, concentrically therewith, the permanent magnet portion being so disposed that the rotation of the rotary body does not alter the magnetic flux distribution around the axis of rotation of the rotary body, the permanent magnet portion comprising a disk of nonmagnetic material fixedly mounted on the periphery of the rotary body concentrically therewith and provided with an annular groove on an end face thereof, a plurality of annular permanent magnets disposed at a spacing radially of the rotary body and fixed in the annular groove on the end face of the disk so as not to project from the groove, and an annular yoke of ferromagnetic material fixed in the annular groove on the end face of the disk and interposed between each two adjacent permanent magnets, each of the permanent magnets being magnetized to opposite polarities at its respective sides radially of the rotary body, each two adjacent permanent magnets being magnetized to the same polarity at their sides opposed to each other with the yoke interposed therebetween; and a superconductor opposed to the end face of the magnet portion and the annular groove on the end face and spaced apart therefrom axially of the rotary body, the superconductor being disposed at a position which is spaced apart from the magnet portion by a distance permitting a predetermined quantity of magnetic flux of the magnet portion to penetrate into the superconductor and which does not permit the rotation of the rotary body to alter the penetrating magnetic flux distribution.

4. A superconducting bearing device as defined in claim 3 wherein the innermost and outermost permanent magnets with respect to the radial direction of the rotary body are further provided with an annular yoke of ferromagnetic material on the radially inner and outer sides thereof respectively.

5. A superconducting bearing device as defined in claim 3 wherein the yokes each have an end face opposed to the superconductor and projecting beyond the corresponding end faces of the permanent magnets toward the superconductor.

6. A superconducting bearing device as defined in claim 3 wherein the annular permanent magnets each comprise a plurality of divided segments arranged circumferentially thereof.

7. A superconducting bearing device as defined in claim 6 wherein the annular permanent magnets each comprises a plurality of divided segments divided circumferentially thereof in two radially adjacent annular permanent magnets.

8. A superconducting bearing device as defined in claim 3 further comprising a fixing ring of nonmagnetic material, wherein a hollow cylindrical wall is integrally formed on the inner peripheral edge of the disk, the annular permanent magnets and the annular yokes being arranged around the periphery of the hollow cylindrical wall, the fixing ring being fixedly fitted to the outer periphery of the disk so as to fix the annular permanent magnets and the annular yokes on the disk.

9. A superconducting bearing device as defined in claim 3 wherein a hollow cylindrical wall is integrally formed on both the inner and outer peripheral edges of the disk, the annular permanent magnets and the annular yokes being forced into the interior of the hollow cylindrical wall of the outer peripheral side to define a very small clearance between the innermost of the magnets and yokes and the hollow cylindrical wall of the inner peripheral edge.

* * * * *